US011753602B2

(12) United States Patent
Tarnow et al.

(10) Patent No.: US 11,753,602 B2
(45) Date of Patent: Sep. 12, 2023

(54) EDIBLE OIL REFINING

(71) Applicant: Cargill, Incorporated, Wayzata, MN (US)

(72) Inventors: Armin Willem-Friedrich Hermann Tarnow, Rotterdam (NE); Ignacio Vilas Eguileta, Spijkenisse (NE)

(73) Assignee: Cargil, Incorporated, Wayzata, MN (US)

( * ) Notice: Subject to any disclaimer, the term of this patent is extended or adjusted under 35 U.S.C. 154(b) by 0 days.

(21) Appl. No.: 16/967,318

(22) PCT Filed: Feb. 21, 2019

(86) PCT No.: PCT/US2019/018955
§ 371 (c)(1),
(2) Date: Aug. 4, 2020

(87) PCT Pub. No.: WO2019/165071
PCT Pub. Date: Aug. 29, 2019

(65) Prior Publication Data
US 2021/0032560 A1 Feb. 4, 2021

(30) Foreign Application Priority Data

Feb. 21, 2018 (EP) .................................... 18157904
Jul. 18, 2018 (EP) .................................... 18184132
Aug. 3, 2018 (EP) .................................... 18187287

(51) Int. Cl.
*C11B 3/14* (2006.01)
*A23D 9/04* (2006.01)
*B01D 3/38* (2006.01)

(52) U.S. Cl.
CPC .................. *C11B 3/14* (2013.01); *A23D 9/04* (2013.01); *B01D 3/38* (2013.01)

(58) Field of Classification Search
CPC ................ C11B 3/14; B01D 3/38; A23D 9/04
See application file for complete search history.

(56) References Cited

U.S. PATENT DOCUMENTS 4,378,317 A * 3/1983 Seguine .................... B01D 3/10
554/205
5,091,116 A * 2/1992 Krishnamurthy ....... C11B 3/001
426/313
7,718,698 B2 * 5/2010 Breivik ..................... A61P 3/06
426/601
7,892,335 B2 * 2/2011 Kellens .................... C11C 1/106
261/96
9,114,329 B2 * 8/2015 Galina ....................... C11B 3/14
10,150,053 B2 * 12/2018 Sarup ........................ C11B 3/12
11,149,229 B2 * 10/2021 Maiworm ................. C11B 3/10
2012/0289726 A1 * 11/2012 Josten ...................... C11C 3/003
554/170

FOREIGN PATENT DOCUMENTS

| CN | 102470284 B | 10/2016 | |
| CN | 206721116 U | 12/2017 | |
| CN | 105121615 B | 4/2018 | |
| EP | 0866843 | * 10/2001 | ............... C11B 3/14 |
| EP | 0866843 B1 | 10/2001 | |
| EP | 1905815 A1 | 4/2008 | |
| EP | 1905816 B1 | 8/2015 | |
| GB | 816522 A | 7/1959 | |
| RU | 2599643 C2 | 10/2016 | |
| WO | 2004007654 W | 1/2004 | |
| WO | 2011019315 W | 2/2011 | |
| WO | 2014033664 W | 3/2014 | |
| WO | 2019165071 A1 | 8/2019 | |

OTHER PUBLICATIONS

Loft S C ED—Koseoglu Semih Sefa et al.: Deodorization—Theory and Practice, Jan. 1, 1989, Advances in Oils and Fats, Antioxidants, and Oilseed By-Prod, Champaign, Ill. : AOCS Press US, pp. 117-122, XP008134203.

Golovanchikov A.B., Prokhorenko N.A., Karev V.N. "Algorithm for calculating the packed distillation column with allowance for longitudinal mixing in the liquid phase", Izvestya VolgGTU, 2016, pp. 14 to 17.

"Editable Lipid Processing Technology", He Dongping, HuBei Science & Technology Press, 1st Edition, Dec. 2010, pp. 124-125.

"Food Biochemistry", Hong QingCi, Nanjing University Press, 1st Edition, May 2000, pp. 84-85.

* cited by examiner

*Primary Examiner* — Yate' K Cutliff

(57) ABSTRACT

The present invention relates to a process for improving the quality of edible oils or fats and in the process an edible oil is passed through an oil refining equipment consisting of a stripping column with packing and not more than one oil collection tray. It further relates to the use of the refining equipment consisting of a stripping column with packing and not more than one oil collection tray, for degrading, decomposing or breaking down oxidation products of triglycerides, diglycerides, monoglycerides and/or fatty acids.

12 Claims, No Drawings

EDIBLE OIL REFINING

CROSS-REFERENCE TO RELATED APPLICATIONS

This application is a national phase application of PCT/US2019/018955, filed 2 Feb. 2019, entitled EDIBLE OIL REFINING, which claims the benefit of priority to European Provisional Application No. 18157904.6, filed 21 Feb. 2018, entitled EDIBLE OIL REFINING, and European Provisional Application No. 18184132.1, filed 18 Jul. 2018, entitled EDIBLE OIL REFINING, and European Provisional Application No. 18187287.0, filed 3 Aug. 2018, entitled EDIBLE OIL REFINING which are hereby incorporated by reference in their entirety.

FIELD OF THE INVENTION

A refining process using a packed stripping column for improving quality of edible oils.

BACKGROUND OF THE INVENTION

Crude oils, as extracted from their original source, are often not suitable for human consumption due to the presence of high levels of impurities, which may be either harmful or may cause an undesirable color, odor or taste. Crude oils are typically therefore refined before use. The refining process typically consists of the following major steps: degumming and/or alkali refining, bleaching and deodorizing. An oil obtained after completion of the refining process (called a "NBD" or "RBD oil") is normally considered suitable for human consumption and may therefore be used in the production of any number of foods and beverages.

During the deodorization, the oil is heated to elevated temperatures and is kept for a long residence time at the elevated temperature in order to break-down flavor precursors and color compounds, and drive off volatile impurities and undesired substances from the oil by means of vacuum and steam injected through the oil.

On the market there are today a large number of different deodorization plants, such as continuous flow, batch wise treatment and the like. It is commonly known that retention deodorizer trays and long residence times are needed to improve the quality of oils.

However, there is a need for improving the refining process of oils or fats.

The current invention provides such a process.

SUMMARY OF THE INVENTION

The current invention relates to a process for improving the quality of edible oils or fats and the process is comprising the following steps:
  a) Passing under vacuum an edible oil through an oil refining equipment, and applying stripping agent to the flow of the oil, while contacting the oil with the stripping agent, and reducing the content of hydroperoxides and/or volatiles from the oil, and
  b) Collecting the refined edible oil from step a),
    wherein the refining equipment is consisting of a stripping column with packing and not more than one oil collection tray.

It further relates to the use of refining equipment consisting of a stripping column with packing, and not more than one oil collection tray, for degrading, decomposing or breaking down oxidation products of triglycerides, diglycerides, monoglycerides and/or fatty acids.

DETAILED DESCRIPTION

The current invention relates to a process for improving the quality of edible oils or fats and the process is comprising the following steps:
  a) Passing under vacuum an edible oil through an oil refining equipment, and applying stripping agent to the flow of the oil, while contacting the oil with the stripping agent, and reducing the content of hydroperoxides and/or volatiles from the oil, and
  b) Collecting the refined edible oil from step a),
    wherein the refining equipment is consisting of a stripping column with packing, and not more than one oil collection tray.

The current invention relates to a process for improving the taste and flavour of edible oils or fats and the process is comprising the following steps:
  a) Passing under vacuum an edible oil through an oil refining equipment, and applying stripping agent to the flow of the oil, while contacting the oil with the stripping agent, and reducing the content of hydroperoxides and/or volatiles from the oil, and
  b) Collecting the refined edible oil from step a),
wherein the refining equipment is consisting of a stripping column with packing, and not more than one oil collection tray.

The current invention relates to a process for obtaining edible oils or fats with bland taste and the process is comprising the following steps:
  a) Passing under vacuum an edible oil through an oil refining equipment, and applying stripping agent to the flow of the oil, while contacting the oil with the stripping agent, and reducing the content of hydroperoxides and/or volatiles from the oil, and
  b) Collecting the refined edible oil from step a),
wherein the refining equipment is consisting of a stripping column with packing, and not more than one oil collection tray.

The current invention relates to a process for reducing hydroperoxides and/or off-flavours from edible oils and the process is comprising the following steps:
  a) Passing under vacuum an edible oil through an oil refining equipment, and applying stripping agent to the flow of the oil, while contacting the oil with the stripping agent, and reducing the content of hydroperoxides and/or volatiles from the oil, and
  b) Collecting the refined edible oil from step a),
wherein the refining equipment is consisting of a stripping column, and not more than one oil collection tray.

The "refining equipment consisting of a stripping column with packing and not more than one oil collection tray" indicates that the refining ability of the refining equipment is obtained from the use of the stripping column and not more than one oil collection tray. It is to be understood that in order to operate the refining equipment, valves, pumps, heat exchangers and the like will be needed. An in-line heater may be used before the stripping column.

The "not more than one" oil collection tray is a range covering "up to one" collection tray, and thus including also no collection tray.

In an aspect of the present invention where one collection tray is present, it is meant to collect the oil that drops down from the packing by gravity and makes it available for pumps that transport the oil. No process and/or quality changes are performed in the collection tray. The only purpose of the collection tray is a collection and/or accumulation of oil for hold-up purposes. There are no chemical and/or physical changes in the quality of the oil while residing in the collection tray. A refining equipment with no collection tray is suitable as well. In absence of a collection tray, the oil will be directly transported without collection in the refining equipment of step a). The oil is cooled down by applying a heat exchanger. There is no need for mixing of the oil with a quenching oil.

Step b) involves the collection of the refined oil, and it is obtaining the oil of step a).

The refining equipment of step a) in the present invention is not containing retention trays. Retention trays, retention vessels, or compartments, also known as sections, are always present in standard deodorizer equipment known in the art, whether batch, continuous or semi-continuous deodorizer equipment. Batch, continuous or semi-continuous deodorizers are built of these different compartments, the retention trays. In each tray the oil is kept for a certain time at high temperature and steam is introduced into the oil. Long retention time of the oil is needed to obtain physical and chemical changes in the oil, obtained by forcing the oil from one tray to the next tray. Components such as amongst others, colour, flavour and/or flavour precursors are decomposed into volatile breakdown products which are then removed by steam passing through the oil in the retention trays. In order to obtain oils of acceptable to good quality, long retention (residence) times are required. However, these long residence times at high temperatures are known to be responsible for the formation of further unwanted process contaminants, such as chloropropanol esters (3-MCPD esters), glycidyl esters, trans fatty acids, and the like. Additionally, components present in the oil and which are known to be beneficial for the oxidation stability of the oil may be decomposed and the content of these components such as tocopherols, tocotrienols, and the like may be significantly reduced. These are amongst others good reasons to avoid long retention times at high temperatures.

Furthermore, these retention trays may add to the complexity of the known-in the art deodorizers and thus resulting in high investment costs. The retention trays retain high volumes of the oil in the equipment. Keeping such high volumes of oil at high temperature for a long time also represents a significant energy cost. Switching from one to another edible oil may be complicated and the risk of comingling is further increased.

The refining equipment consisting of a stripping column with packing and one or no oil collection tray applied in the process of the present invention is not suffering from the previously outlined disadvantages. It further includes amongst others the simplicity of the equipment, low investment costs and ease of operation, and the ability to have a quick throughput (due to e.g. short residence times and low risk of comingling).

The stripping agent is steam or any other stripping gas, such as nitrogen gas. Preferably steam is used as stripping agent.

The stripping agent is applied co-current or counter-current to the flow of the oil. Preferably the stripping agent is applied counter-current to the flow of the oil. In one aspect of the process of the invention wherein the stripping agent is applied counter-current to the flow of the oil, the stripping agent is introduced at the bottom or near the bottom of the stripping column.

The equipment can be operated at an absolute pressure below 8 mbar, from 0.1 to 8 mbar, from 0.5 to 7 mbar, from 1 to 6 mbar, from 1.5 to 5 mbar, 2 to 4 mbar.

The current invention relates to the process wherein the refining equipment is operated at a temperature of from 170 to 240° C., from 180 to 230° C., from 190° C. to 225° C., from 195 to 220° C., from 197 to 215° C., from 198 to 210° C., from 170° C. to 215° C., from 170° C. to 205° C.

The packing in the stripping column can be random packing or structured packing. Preferably the packing is a structured packing.

The term structured packing is well-known in the technical field and it refers to a range of specially designed materials for use in absorption and distillation columns Structured packings typically consist of thin corrugated metal plates arranged in a way that force fluids to take complicated paths through the column and thereby creating a large surface, which can enhance the interaction between oil and stripping agent.

The packing in the equipment of the present invention is having a specific surface of from 100 to 750 $m^2/m^3$, from 100 to 500 $m^2/m^3$, from 150 to 400 $m^2/m^3$, from 150 to 300 $m^2/m^3$, from 200 to 250 $m^2/m^3$.

It is to be understood that the process of the current invention is suitable to improve the quality of the edible oils. The quality encompasses the improvement of taste and flavour, reduction of off-flavours, such as aldehydes, i.e. secondary oxidation products. In another aspect of the invention it encompasses the reduction of primary oxidation products such as hydroperoxides (measured as peroxide value according to AOCS method Cd 8b-90). It further improves the oxidative stability of edible oils.

Surprisingly, it is found that, a refining equipment, consisting of a stripping column with packing and not more than one oil collection tray, is suitable to improve the quality of edible oils and to reduce the content of hydroperoxides and/or volatiles from the oil. So far it is known that a deodorizer comprising several retention trays is needed to obtain edible oil with good quality including, removal of hydroperoxides and/or volatiles, and/or obtaining bland taste. The current invention demonstrates that there is no need for the retention deodorizer trays and a refining equipment consisting of a stripping column with packing and not more than one oil collection tray allows obtaining edible oils of good to excellent quality.

In one aspect of the invention the stripping column with packing has an oil loading of from 0.5 to 10.0 $kg/m^2h$ surface of packing, of from 0.5 to 4.0 $kg/m^2h$, from 0.5 to 3.5 $kg/m^2h$ surface of packing, from 0.6 to 3.4 $kg/m^2h$, from 0.7 to 3.3 $kg/m^2h$, from 0.8 to 3.2 $kg/m^2h$, from 0.9 to 3.1 $kg/m^2h$, from 1.0 to 3.0 $kg/m^2h$, from 1.5 to 2.8 $kg/m^2h$, from 2.0 to 2.5 $kg/m^2h$, preferably from 1.0 to 3.0 $kg/m^2h$. An oil loading of 1.6, 2.2, 2.3, 2.4 or 2.5 $kg/m^2h$ surface of packing is likewise applicable.

Surprisingly, it was found that by reducing the oil loading, the results are positively affected. The oil loading (expressed in $kg/m^2h$ surface of packing) is impacted by the flow rate and the packing area which in itself encompasses a relation between specific surface of the packing and packing volume. The flow rate is impacted by, amongst others, the efficiency and/or economic viability of the industrial refining process. The inventors have found that in particular the increase of packing area will help to improve the quality of the refined oils. The oil loading can be at least one of the parameters to distinguish the efficiency of the process.

The height to diameter ratio of the stripping column is from 0.1 to 10, from 0.5 to 5, from 1 to 4.9, from 1.4 to 4.7, from 1.4 to 4.5, from 1.5 to 4.4, from 1.5 to 4.3, from 1.5 to 4.2, from 1.6 to 4.0, from 1.6 to 3.0, from 1.7 to 2.8. Height to diameter ratios of 1.2, 1.3, 1.8, 1.9, 2.0, 2.1, 2.5, 3.5, 3.6, 3.7, 4.1 are likewise applicable. Alternatively, height to diameter ratios of 6, 7, 8 and 9 can be applied.

It has been found that the height to diameter ratio is from 0.1 to 10, with the proviso that the height is not 1 meter while the diameter is 200 millimetres.

In one aspect of the invention, the edible oil is heated before passing through the oil refining equipment. The heating can be performed by using technologies known in the art. It may be heated by using counter-current heating or by placing an in-line heating system or the like.

In a further aspect of the invention, the current process comprises a pre-heating step prior to step a).

In a further aspect of the invention, the current process allows for a short residence time. In particular, a total residence time in the refining equipment, having not more than one collection tray, and including the pre-heating (using in-line heater) of the edible oil prior to passing the edible oil through the refining equipment, is not more than 20 minutes, from 1 to 18 minutes, from 5 to 16 minutes, from 10 to 14 minutes. Total residence times of 4.6, 6.0, 6.1, 7.3, 7.4, 7.5, and 8.6 minutes are likewise applicable. More in particular, the process of the present invention allows a residence time in the packing of the stripping column of from 1 to 10 minutes, from 1 to 9 minutes, from 2 to 8 minutes, from 3 to 7 minutes, from 4 to 6 minutes, from 1 to 5 minutes, from 1 to 3 minutes. Residence times of 3.2, 3.5 or 4.7 minutes are likewise applicable.

The present invention demonstrates that if one is aiming to work at temperatures below 215° C., below 210° C., below 205° C., from 180 to 200° C., to be able to obtain acceptable to good quality of the refined oils the oil refining equipment is comprising a stripping column with packing and an oil loading of from 0.5 to 4.0 kg/m$^2$h surface of packing.

It is possible to have a low load of oil (expressed as kg/m$^2$h surface of packing), such as from 0.5 to 4.0 kg/m$^2$h and this is allowing for a suitable short residence time. It is to be understood that the residence time is affected by the type of packing, loading of oil, and dimensions of the column Residence time can be increased or decreased by modifying one or more of these factors. The known-in-the art deodorizers are requiring longer residence times due to the presence of the retention trays.

The edible oils are derived from any type, source or origin. It may relate to vegetable oils or fats, animal oils or fats, fish oils, microbial oils or algae oils, preferably edible oils. They may be derived, for example, from one or more vegetable and/or animal sources and may include oils and/or fats from a single origin or blends of two or more oils and/or fats from different sources or with different characteristics. They may be derived from standard oils or from specialty oils such as oils with low 3-MCPD (3-monochloropropane-1,2-diol) esters, low GE-oils (GE=glycidyl esters), from modified or unmodified oils and/or fats (i.e. from oils in their natural state or oils that have been subjected to a chemical or enzymatic modification, to a hydrogenation, or to fractionation) and so on. Preferably, they will be derived from vegetable oils or vegetable oil blends. Examples of suitable vegetable oils include: soybean oil, corn oil, cottonseed oil, linseed oil, olive oil, palm oil, palm kernel oil, coconut oil, peanut oil, rapeseed oil, safflower oil, sunflower oil, sesame seed oil, rice bran oil, canola oil babassu oil, cohune oil, tacum oil, cuphea oil, and any fractions or derivatives thereof.

Palm oil is encompassing palm oil, as well as palm oil fractions such as stearin and olein fractions (single as well as double fractionated, and palm mid fractions) and blends of palm oil and/or its fractions.

In one aspect of the invention the edible oil is a vegetable liquid oil. The vegetable liquid oils are selected from the group consisting of oils from cotton, corn, groundnut, linseed, olive, rape, canola, sesame, safflower, soybean, sunflower, their corresponding mid or high oleic varieties or any variety with increased level of unsaturated fatty acids compared to the original seed variety, and mixture of two or more thereof. These varieties with increased levels of unsaturated fatty acids can be obtained by natural selection or by genetic modification (GMO). Preferably the vegetable oil is selected from the group consisting of corn, rape, canola, soybean, sunflower, their corresponding high oleic varieties, and mixture of two or more thereof. The high oleic varieties are containing at least 40%, at least 50%, at least 60%, at least 70%, preferably at least 80% oleic acid in respect of the fatty acid profile. Preferably the vegetable oil is selected from the group consisting, rape, canola, soybean, sunflower, and mixture of two or more thereof.

In a further aspect of the invention the vegetable liquid oil is rapeseed oil, sunflower oil or combinations thereof. In yet another aspect of the invention, the vegetable liquid oil is rapeseed oil or canola oil.

In another aspect of the invention the edible oil is selected from palm oil, palm oil based material, any palm variety with altered fatty acid composition versus the original palm variety, and combinations thereof, whereby the palm oil based material refers to palm oil which has been fractionated, hydrogenated, chemically interesterified, enzymatic interesterified or a combination of one or more of these treatments. The palm variety refers to any palm variety with altered fatty acid composition versus the original palm variety, such as high oleic palm varieties, obtained by natural selection or by genetic modifications (GMO). Preferably the palm based material is fractionated palm oil and fractions such as stearin and olein fractions (single as well as double fractionated), palm mid fractions and blends of palm oil and/or its fractions are included as well. Preferably the palm based material is fractionated palm oil, fractions and combinations thereof. In yet another aspect of the invention, the vegetable oil is selected from palm oil, a palm oil fraction or a combination thereof.

Furthermore, the edible oil, preferably the vegetable oil is a crude oil, bleached oil, an RBD-oil, an NBD oil, or any further refined and/or processed RBD/NBD oil, which is as such referring to the refining process applied to the oils before entering the equipment. RBD stands for refined bleached and deodorized oil and corresponds to a typical physically refined oil. NBD stands for neutralized bleached deodorized oil and corresponds to a chemically refined oil. Processing is including but not limited to fractionation, chemical or enzymatic interesterification and hydrogenation. Preferably the quality of the oil entering the process in step a) is such that the content of free fatty acids is not more than 0.2%, not more than 0.15%, preferably not more than 0.1%, more preferably not more than 0.07%, not more than 0.06% (measured according to AOCS method Ca 5a-40). In one aspect of the invention, the edible oil of step a) in the process has been treated with one or more refining steps.

In a particular aspect of the invention the edible oil of step a) is a low-coloured oil that has not yet been subjected to deodorization. A low-coloured oil is an oil characterized by a Lovibond red colour of max 4R, more preferably max 3.5R, most preferably max 3R, max 2.5R, max 2R and a Lovibond yellow colour of max 40Y, more preferably max 35Y, most preferably max 30Y, max 25Y, max 20Y (measured in a 5¼ inch glass measuring cell according to AOCS method Cc13e-92). A typical example of such an oil is soybean oil, peanut oil, sunflower oil, high oleic sunflower oil, palm kernel oil, coconut oil, cottonseed oil, linseed oil, and mixtures of two or more thereof.

In another particular aspect of the invention the edible oil of step a) is a coloured oil that has not yet been subjected to deodorization and the collected refined edible oil obtained in step b) is a coloured refined oil. Typical examples of such oils, but not limited, are red palm, red palm olein, algal oil, and mixtures thereof.

In another aspect of the invention, the edible oil of step a) has been treated with one or more refining steps, preferably the edible oil is a refined, bleached and deodorized (RBD or NBD) oil.

The process of the present invention allows to improve, re-fresh the quality of an RBD or NBD oil. RBD or NBD oil with reduced quality (also qualified as "aged oil") for instance due to long transportation, long storage can be re-freshed by the process of the presented invention. The current invention has demonstrated that by passing such an aged refined, bleached and deodorized oil through a refining equipment consisting of a stripping column with packing and not more than one oil collection tray, the content of hydroperoxides, and volatiles can be reduced. It allows for short residence times (such as mentioned before) and the quality of the thus obtained oil is good to excellent, especially regarding taste and oxidation stability. In one aspect of the invention the RBD or NBD oil is palm oil.

In fact, most of the off-flavour compounds in fats and oils are produced by the reaction of oxygen with unsaturated fatty acids in triacylglycerols or polar lipids. The reaction of unsaturated lipids with oxygen form hydroperoxides (also called primary oxidation products). These hydroperoxides are usually very unstable and break down into a wide variety of volatile flavour compounds, such as aldehydes and ketones (also known as the secondary oxidation products). These aldehydes are significant off-flavour compounds and are often responsible for the undesirable flavours, and/or smell in fats and oils.

The process of the current invention is set-up that it allows either obtaining oils with an oxidative stable oil with peroxide value <1 meq/kg, <0.5 meq/kg or even <0.1 meq/kg and bland taste and a typical refined oil-specific Oxidation Stability Index (OSI). Or the process of the current invention allows obtaining oils with a PV reduced with at least 40%, at least 50%, at least 60%, at least 70%, at least 80%, at least 85%, at least 90%, at least 95%, at least 99% in comparison with PV of aged oil.

In one aspect of the present invention the process uses an oil refining equipment and it is further comprising a heating step before passing the oil through the refining equipment, for example by using an in-line heater. Without being bound to any scientific explanation, it may be noted that the primary oxidation products, such as hydroperoxides, may be partially decomposed during the heating step. The complete decomposition of the hydroperoxides may start or continue in the stripping column of the refining equipment applied in the process of the present invention.

It has been observed that oils with an acceptable peroxide value, still may suffer from unacceptable taste and flavour. The process of the present invention allows to improve the taste and flavour of edible oils having an acceptable peroxide value, by removing the volatiles such as aldehydes and ketones.

The bland taste (=no off-flavours) can be further quantified by measuring the flavoured aldehydes. Specific aldehydes that are formed may depend upon the type of oil they originate from. Without being bound to any theory, the location and the number of unsaturated bounds in the fatty acids on the triglycerides, can determine the type of aldehyde that is typically formed as oxidation product for a specific oil. Non-limiting examples of aldehydes that are likely formed as typical oxidation products from oils rich in oleic acid (such as palm oil) are hexanal and nonanal. For oils rich in linoleic acid (such as sunflower oil) typical, but not limited, oxidation products are hexanal and 2-nonenal. For oils rich in linolenic acid (such as rapeseed oil) typical, but not limited, oxidation products are propanal and 2,4-heptadienal.

Furthermore, the use of the present invention allows obtaining the oil with minimal losses of desired constituents. The process of the present invention allows to obtain good to excellent quality of the oil in respect of nutrition quality, and chemical quality. Undesired contaminants are not present, and the desired constituents are maintained to the largest extend possible.

Surprisingly, it is shown that by applying the process of the present invention, the decomposition, degradation or breakdown of oxidation products is occurring in the stripping column of the refining equipment at a much faster rate and usually at significant lower temperatures in comparison with standard continuous (or batch, or semi-continuous) deodorizers with retention deodorizer trays.

Typically, running the current process at a temperature of maximum of 230° C., maximum 220° C., maximum of 215° C., maximum 205° C., maximum of 200° C. and in a much shorter retention time in the stripping packing, e.g. maximum of 8 minutes, allows to obtain the required oil quality with respect to oxidation stability, odour and taste. A standard continuous (or batch, or semi-continuous) deodorizer is operating usually at higher temperatures and is requiring more than double of this retention time. By running the process at temperatures that are lower than refining temperatures in traditional deodoriser systems (e.g. below 240° C.), the current process avoids the formation of unwanted products and process contaminants such as trans fatty acids, chloropropanol compounds and glycidyl esters.

The process of the present invention allows the reduction of the peroxide values of the vegetable oils or fats. This reduction is significant. The edible oils at the start of the process have a peroxide value (=PV) of 0.30 to 10 meq/kg, from 0.30 to 7 meq/kg, from 0.30 to 5 meq/kg. Typically an aged RBD oil has a PV of more than 4 meq/kg. The PV is reduced to a peroxide value below 0.9 meq/kg, below 0.5 meq/kg, below 0.4 meq/kg, below 0.3 meq/kg, below 0.2 meq/kg, below 0.1 meq/kg, below 0.075 meq/kg. Or PV is reduced with at least 40%, at least 50%, at least 60%, at least 70%, at least 80%, at least 85%, at least 90%, at least 95%, at least 99% in comparison to the PV of the aged RBD oil.

The process of the present invention allows to reduce the off-flavours compounds.

In one specific aspect of the invention the process for improving the quality of edible oils or fats and the process is comprising the following steps:
 a) Passing under vacuum at a temperature of from 190 to 235° C. an edible oil through an oil refining equipment comprising a stripping column with packing and a height to diameter ratio from 0.1 to 10, and applying stripping agent to the flow of the oil, while contacting the oil with the stripping agent, and reducing the content of hydroperoxides and/or volatiles from the oil, and b) Collecting the refined edible oil, wherein the edible oil is a vegetable liquid oil.

In one specific aspect of the invention the process for improving the quality of edible oils or fats and the process is comprising the following steps:

a) Passing under vacuum at a temperature of from 190 to 235° C. an edible oil through an oil refining equipment comprising a stripping column with packing and an oil loading of from 0.5 to 10.0 kg/m²h surface of packing and a height to diameter ratio from 0.1 to 10, and applying stripping agent to the flow of the oil, while contacting the oil with the stripping agent, and reducing the content of hydroperoxides and/or volatiles from the oil, and b) Collecting the refined edible oil, wherein the edible oil is a vegetable liquid oil.

In a further aspect of the invention, wherein the edible oil is a vegetable liquid oil, the oil refining equipment has an oil loading of from 0.5 to 9.0 kg/m²h surface of packing, from 0.5 to 8.0 kg/m²h, from 0.5 to 7.0 kg/m²h, from 0.5 to 6.5 kg/m²h, from 0.5 to 6.0 kg/m²h, from 0.5 to 5.0 kg/m²h surface of packing.

In one specific aspect of the invention the process for improving the quality of edible oils or fats and the process is comprising the following steps:

a) Passing under vacuum at a temperature of from 190 to 215° C. an edible oil through an oil refining equipment comprising a stripping column with packing and an oil loading of from 4.1 to 10.0 kg/m²h surface of packing and a height to diameter ratio from 0.1 to 10, and applying stripping agent to the flow of the oil, while contacting the oil with the stripping agent, and reducing the content of hydroperoxides and/or volatiles from the oil, and b) Collecting the refined edible oil, wherein the edible oil is a vegetable liquid oil.

It has been demonstrated that the process of improving the quality of a vegetable liquid oil is applying a refining equipment consisting of not more than one collection tray and a stripping column the quality is further improved at lower temperature of 170 to 225° C. when a applying a stripping column with packing and an oil loading of from 0.5 to 4.0 kg/m2h surface of packing and a height to diameter ratio from 0.1 to 10.

In a further aspect of the invention, wherein the edible oil is a vegetable liquid oil, the oil refining equipment has an oil loading of from 4.1 to 9.0 kg/m2h surface of packing, from 4.1 to 8.0 kg/m2h, from 4.1 to 7.0 kg/m2h, from 4.1 to 6.5 kg/m2h, from 4.1 to 6.0 kg/m2h, from 4.1 to 5.0 kg/m2h surface of packing.

In one specific aspect of the invention the process for improving the quality of edible oils or fats and the process is comprising the following steps:

a) Passing under vacuum at a temperature of from 170 to 215° C., from 170 to 210° C., from 170 to 205° C., from 180 to 200° C. an edible oil through an oil refining equipment comprising a stripping column with packing and an oil loading of from 0.5 to 4.0 kg/m²h surface of packing and a height to diameter ratio from 0.1 to 10, and applying stripping agent to the flow of the oil, while contacting the oil with the stripping agent, and reducing the content of hydroperoxides and/or volatiles from the oil, and b) Collecting the refined edible oil, wherein the edible oil is palm oil.

In one aspect of the invention the stripping column with packing has an oil loading of from 0.5 to 4.0 kg/m2h, from 0.5 to 3.5 kg/m2h surface of packing, from 0.6 to 3.4 kg/m2h, from 0.7 to 3.3 kg/m2h, from 0.8 to 3.2 kg/m2h, from 0.9 to 3.1 kg/m2h, from 1.0 to 3.0 kg/m2h, from 1.5 to 2.8 kg/m2h, from 2.0 to 2.5 kg/m2h, preferably from 1.0 to 3.0 kg/m2h. An oil loading of 1.6, 2.2, 2.3, 2.4 or 2.5 kg/m2h surface of packing is likewise applicable.

In one specific aspect of the invention the process for improving the quality of edible oils or fats and the process is comprising the following steps:

Passing under vacuum at a temperature of from 170 to 215° C., from 170 to 210° C., from 170 to 205° C., from 180 to 200° C., an RBD palm oil through an oil refining equipment comprising a stripping column with packing and an oil loading of from 0.5 to 4.0 kg/m2h surface of packing and a height to diameter ratio from 0.1 to 10, and applying stripping agent to the flow of the oil, while contacting the oil with the stripping agent, and removing hydroperoxides and/or volatiles from the oil, and Collecting the refined palm oil.

Deodorization is a commonly known process. It involves the stripping of volatile components, the removal of off-flavors and the thermal degradation of unwanted components.

Typically, deodorization is occurring in a deodorizer whereby the deodorizer may have several configurations, such as horizontal vessels, vertical tray-type deodorizers and combined with packed columns. It is commonly known that at least one retention deodorizer trays is needed to allow for the decomposition of hydroperoxides and for the removal of off-flavours, and typically the retention time is from 30 to 60 minutes, up to 4 hours.

It has been found that in the process of the present invention, the primary oxidation products are decomposed and the formed secondary oxidation products are removed as volatiles usually at low deodorization temperature. Only short residence times in the stripping column are needed, or short total residence time, i.e. residence time in stripping column and including the pre-heating step. The passing through the refining equipment consisting of a stripping column with packing and not more than one oil collection tray and including the heating prior to passing the edible oil through the refining equipment requires a total residence time in the equipment of not more than 20 minutes, from 1 to 18 minutes, from 5 to 16 minutes, from 10 to 14 minutes. Total residence times of 4.6, 6.0, 6.1, 7.3, 7.4, 7.5, and 8.6 minutes are likewise applicable. The collected deodorized oil is good to excellent in quality, in particular in respect of parameters such as high oxidative stability, color, neutral in odor and taste.

Furthermore, the current invention relates to the use of refining equipment consisting of a stripping column with packing and not more than one oil collection tray to reduce the content of hydroperoxides and/or volatiles from edible oils.

The use of the present invention allows the reduction of the peroxide values of the edible oils or fats. This reduction is significant. The edible oils at the start of the process have a peroxide value (=PV) of 0.10 to 10 meq/kg, from 0.30 to 7 meq/kg, from 0.30 to 5 meq/kg. Typically, an aged RBD oil has a PV of more than 4 meq/kg. The PV is reduced to a peroxide value below 0.9 meq/kg, below 0.5 meq/kg, below below 0.4 meq/kg, below 0.3 meq/kg, below 0.2 meq/kg, below 0.1 meq/kg, below 0.075 meq/kg. Or PV is reduced with at least 40%, at least 50%, at least 60%, at least 70%, at least 80%, at least 85%, at least 90%, at least 95%, at least 99%. The present invention allows to reduce the content of the volatiles such as aldehydes and ketones significantly, preferably to below LOQ.

The obtained edible oils have a bland taste (=no off-flavours) which can be quantified by measuring the flavoured aldehydes.

The current invention relates to the use of refining equipment consisting of a stripping column with packing and not more than one oil collection tray, to improve quality of edible oils. The quality of oil relates to the absence of hydroperoxides and/or volatiles, and/or the absence of off-smell and off-taste of the oil. The use of refining equipment consisting of a stripping column with packing and not more than one oil collection tray, allows obtaining edible oils that have a bland taste.

The current invention relates to the use of refining equipment consisting of a stripping column with packing and not more than one oil collection tray, to obtain edible oil with an overall flavour quality score of at least 7, 8 or 9 according to AOCS method Cg 2-83 (with 10 being an excellent overall flavour quality score and 1 being the worst score).

It is known that according to existing art, at least one retention deodorizer is needed in batch, continuous or semi-continuous deodorizers to obtain good quality of edible oils. The current invention has demonstrated that the use of refining equipment consisting of a stripping column with packing and not more than one oil collection tray, allows obtaining equally good or better quality than the oils obtained in the batch continuous or semi-continuous deodorizer with at least one retention deodorizer tray.

It further relates to the use wherein the stripping column has a packing allowing an oil loading of from 0.5 to 4.0 kg/m²h surface of packing. It further relates to the use wherein the stripping column has a height to diameter ratio from 0.1 to 10.

It relates to the use of a stripping column with packing and an oil loading of from 0.5 to 4.0 kg/m²h surface of packing and a height to diameter ratio from 0.1 to 10 to improve taste and flavour of edible oils, with the proviso that the height is not 1 meter and the diameter is not 200 millimetres.

The current invention relates to the use of an oil refining equipment comprising a stripping column with packing and an oil loading of from 0.5 to 4.0 kg/m²h surface of packing and a height to diameter ratio from 0.1 to 10 to improve quality of edible oils, to remove hydroperoxides and/or volatiles from edible oils, and/or to improve smell and taste of the oil.

The advantages of the current invention are amongst others:
It is clearly shown that quality of RBD palm oil is improved after applying the process of the present invention, even at temperature below 200° C. The PV value is reduced. The OSI is improved. The content of volatiles, such as nonanal in refined palm oil is reduced. The taste is good to excellent preferably when applying an oil refining equipment comprising a stripping column with packing and an oil loading of from 0.5 to 4.0 kg/m²h surface of packing and a height to diameter ratio from 0.1 to 10.

If one is aiming to work at temperatures below 205° C., or form 180 to 200° C., and in order to obtain acceptable to good quality of the refined oils, the oil refining equipment is comprising a stripping column with packing and an oil loading of from 0.5 to 4.0 kg/m²h.

By applying the process of the present invention on aged RBD low-coloured oils or coloured oils, that are collected as refined coloured oils, their quality is improved.

The corresponding PV value is reduced, and taste score is good.

By applying the process of the present invention on RBD vegetable liquid oils, preferably RBD rapeseed oil, its quality is improved. When applying an oil refining equipment comprising a stripping column with packing and an oil loading of from 0.5 to 10.0 kg/m²h surface of packing and a height to diameter ratio from 0.1 to 10, the corresponding PV value is reduced. The taste is good to excellent.

The current invention is illustrated by the following non-limiting examples.

Analytical Methods

The oils were tasted and evaluated for their flavor quality (taste). A flavor quality score was given according to AOCS method Cg 2-83, where a flavour quality score of 10 is an excellent quality and a flavour quality score of 1 is the worst.

Peroxide value (PV) is measured according to AOCS method Cd 8b-90.

Oxidation Stability Index (OSI) is measured according to AOCS method Cd12b-92.

Off-flavour aldehydes were analysed by a dynamic headspace sampling of the oils followed by a separation of the aldehydes using a 2-Dimensional Gas Chromatograph-Time of Flight Mass Spectrometer (2DGC-TOFMS) and quantification based on calibration curves for each aldehyde.

EXAMPLES

RBD Oils were stored for several days at 55° C. and exposed to air until PV increased to above 4 meq/kg to simulate in an accelerated way the aging of the oil.

The aged oils were treated in a refining equipment consisting of an in-line heater, a packed stripping column with the dimensions specified in the tables below, and one collection tray.

Refining conditions used are specified in the tables below.

The quality of the oil after treatment of the present invention was evaluated by measuring PV, taste, OSI, and analysis of the off-flavour aldehydes.

Example 1-3

The pilot scale refining equipment is equipped with a stripping column and one collection tray the dimensions of the pilot scale stripping column are exemplified in Table 1.

TABLE 1

|  | Example 1 | Example 2 | Example 3 |
|---|---|---|---|
| Oil type | RBD rapeseed oil | RBD rapeseed oil | RBD rapeseed oil |
| Aged oil |  |  |  |
| PV | 4.1 meq/kg | 4.1 meq/kg | 4.1 meq/kg |
| Hexanal | 117.35 ppb | 117.35 ppb | 117.35 ppb |
| (e,z)-2,4- | 329.70 ppb | 329.70 ppb | 329.70 ppb |

TABLE 1-continued

|  | Example 1 | Example 2 | Example 3 |
|---|---|---|---|
| Heptadienal Stripping column | | | |
| Height (H) | 0.236 m | 0.236 m | 0.236 m |
| Diameter (D) | 0.256 m | 0.256 m | 0.256 m |
| H/D ratio | 0.922 | 0.922 | 0.922 |
| Packing area | 3.037 m$^2$ | 3.037 m$^2$ | 3.037 m$^2$ |
| Packing volume | 0.012 m$^3$ | 0.012 m$^3$ | 0.012 m$^3$ |
| Packing specific area | 250 m$^2$/m$^3$ | 250 m$^2$/m$^3$ | 250 m$^2$/m$^3$ |
| Process conditions | | | |
| Temperature | 230° C. | 208° C. | 206° C. |
| Flow rate | 19 kg/h | 19 kg/h | 25 kg/h |
| Pressure | 2.6 mbar | 2.6 mbar | 2.6 mbar |
| Sparge steam | 1.0 wt %/h | 1.0 wt %/h | 1.0 wt %/h |
| Oil loading | 6.3 kg/m$^2$h | 6.3 kg/m$^2$h | 8.3 kg/m$^2$h |
| Total retention time (including heating time in in-line heater) | 6.0 min | 6.1 min | 4.6 min |
| Treated oil (after process of present invention) | | | |
| PV | 0 meq/kg | 0.4 meq/kg | 0.8 meq/kg |
| % reduction (PV) | 100% | 90% | 80% |
| Taste | 8 | 7 | 7 |
| Hexanal | <10 ppb | <10 ppb | <10 ppb |
| (e,z)-2,4-Heptadienal | <20 ppb | <20 ppb | 27.54 ppb |

It is shown that at lower temperatures (selected to avoid formation of unwanted compounds and breakdown of beneficial minor compounds in the oil), the absence of these retention trays leads to a worsening of the taste of the refined oil and a significant worsening of PV removal.

Example 4-6

The pilot scale stripping column used in examples 4-6 is equipped with a stripping column and one collection tray. The dimensions of the pilot scale stripping column are exemplified in Table 2.

It is clearly shown that RBD rapeseed oil after the process of the present invention is improved in quality at temperature of about 200-210° C. The PV value is reduced. The taste is good to excellent.

TABLE 2

|  | Example 4 | Example 5 | Example 6 |
|---|---|---|---|
| Oil type | RBD rapeseed oil | RBD rapeseed oil | RBD rapeseed oil |
| Aged oil | | | |
| PV | 4.3 meq/kg | 4.3 meq/kg | 4.3 meq/kg |
| Hexanal | <10 ppb | <10 ppb | <10 ppb |
| (e,z)-2,4-Heptadienal | 41.89 ppb | 41.89 ppb | 41.89 ppb |
| Stripping column | | | |
| Height | 0.708 m | 0.708 m | 0.708 m |
| Diameter | 0.256 m | 0.256 m | 0.256 m |
| Height/diameter ratio | 2.766 | 2.766 | 2.766 |
| Packing area | 9.111 m$^2$ | 9.111 m$^2$ | 9.111 m$^2$ |
| Packing volume | 0.036 m$^3$ | 0.036 m$^3$ | 0.036 m$^3$ |
| Packing specific area | 250 m$^2$/m$^3$ | 250 m$^2$/m$^3$ | 250 m$^2$/m$^3$ |

TABLE 2-continued

|  | Example 4 | Example 5 | Example 6 |
|---|---|---|---|
| Process conditions | | | |
| Temperature | 199° C. | 201° C. | 224° C. |
| Flow rate | 22 kg/h | 19 kg/h | 22 kg/h |
| Pressure | 2.6 mbar | 2.6 mbar | 2.5 mbar |
| Sparge steam | 1.0 wt %/h | 1.0 wt %/h | 1.0 wt %/h |
| Oil loading | 2.4 kg/m$^2$h | 2.1 kg/m$^2$h | 2.4 kg/m$^2$h |
| Total retention time (including heating time in in-line heater) | 7.4 min | 8.6 min | 7.3 min |
| Treated oil (after process of present invention) | | | |
| PV | 0.3 meq/kg | 0.2 meq/kg | 0.0 meq/kg |
| % reduction (PV) | 93% | 95% | 100% |
| Taste | 7 | 8 | 7 |
| Hexanal | <10 ppb | <10 ppb | <10 ppb |
| (e,z)-2,4-Heptadienal | <20 ppb | <20 ppb | <20 ppb |

Example 7-8

It is clearly shown that RBD palm oil after the process of the present invention is improved in quality, even at temperature below 200° C. The PV value is reduced. The OSI is improved. The content of volatiles, such as Nonanal is reduced. The taste is good to excellent when applying an oil refining equipment comprising a stripping column with packing and an oil loading of from 0.5 to 4.0 kg/m$^2$h surface of packing and a height to diameter ratio from 0.1 to 10.

TABLE 3

|  | Example 7 According to invention | Comparative Example 8 |
|---|---|---|
| Oil type | RBD palm oil | RBD palm oil |
| Aged oil | | |
| PV | 4.7 meq/kg | 5.8 meq/kg |
| Nonanal | 136.7 ppb | 180.9 ppb |
| Stripping column | | |
| Height | 0.708 m | 0.236 m |
| Diameter | 0.256 m | 0.256 m |
| Height/diameter ratio | 2.766 | 0.922 |
| Packing area | 9.111 m$^2$ | 3.037 m$^2$ |
| Packing volume | 0.036 m$^3$ | 0.012 m$^3$ |
| Packing specific area | 250 m$^2$/m$^3$ | 250 m$^2$/m$^3$ |
| Process conditions | | |
| Temperature | 180° C. | 183° C. |
| Flow rate | 15 kg/h | 19.1 kg/h |
| Pressure | 2.7 mbar | 2.5 mbar |
| Sparge steam | 1.1 wt %/h | 1.0 wt %/h |
| Oil loading | 1.6 kg/m$^2$h | 6.3 kg/m$^2$h |
| Total retention time (including heating time in in-line heater) | 7.5 min | 6.1 min |
| Treated oil (after process of present invention) | | |
| PV | 0.1 meq/kg | 4 meq/kg |
| % reduction (PV) | 98% | 31% |
| Taste | 7.5 | 3.8 |
| OSI (at 120° C.) | 13.7 h | 12.5 h |
| Nonanal | <25 ppb | 67.2 ppb |

The invention claimed is:

1. A process for improving the quality of edible oils or fats, wherein the process comprises the following steps:
   a) passing under vacuum an edible oil through an oil refining equipment, and applying a stripping agent to the flow of the oil, while contacting the oil with the stripping agent and reducing the content of hydroperoxides, volatiles, or mixtures thereof from the oil, and
   b) collecting the refined edible oil from step a), wherein:
   the refining equipment is consisting of a stripping column with packing and not more than one oil collection tray;
   the edible oil in step a) is having a peroxide value of from 0.30 to 10 meq/kg at the start of the process;
   the stripping column has an oil loading from 0.5 to 4.0 kg/m$^2$h; and
   the stripping column has a height (m) to diameter (m) ratio from 0.1 to 10.

2. The process according to claim 1 wherein in step a) the edible oil is passed through the oil refining equipment at a temperature of from 170° C. to 240° C.

3. The process according to claim 1 wherein the edible oil is heated before passing through the oil refining equipment.

4. The process according to claim 1 wherein the edible oil is passed through the refining equipment and including heating prior to passing the edible oil through the refining equipment with a total residence time of not more than 20 minutes.

5. The process according to claim 1 wherein the edible oil of step a) has been treated with one or more refining steps.

6. The process according to claim 1 wherein the edible oil is a refined, bleached and deodorized oil.

7. The process according to claim 1 wherein the edible oil has not been subjected to a deodorization step.

8. The process according to claim 1 wherein the equipment is operated at an absolute pressure of from 1 to 8 mbar.

9. A method for using a refining equipment, wherein the method comprises:
   passing refined, bleached, and deodorized edible oils under vacuum through the refining equipment; and
   wherein:
   the refining equipment is consisting of a stripping column with packing and not more than one oil collection tray, for degrading, decomposing or breaking down oxidation products of triglycerides, diglycerides, monoglycerides fatty acids, or mixtures thereof;
   the edible oil is having a peroxide value of from 0.30 to 10 meq/kg at the start of the process;
   the stripping column has an oil loading from 0.5 to 4.0 kg/m$^2$h; and
   the stripping column has a height (m) to diameter (m) ratio from 0.1 to 10.

10. The method according to claim 9 wherein hydroperoxides, volatiles, or mixtures thereof from the refined, bleached, and deodorized edible oils are reduced or removed.

11. The method according to claim 9 wherein the peroxide values of the refined, bleached, and deodorized edible oils or fats are reduced.

12. The method of claim 9, wherein passing the refined, bleached, and deodorized edible oils through the refining equipment requires a residence time in the refining equipment of not more than 20 minutes.

* * * * *